(12) United States Patent
Zhu

(10) Patent No.: US 12,103,526 B2
(45) Date of Patent: Oct. 1, 2024

(54) PRECAUTIONARY SLOWDOWN SPEED PLANNING

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 171 days.

(21) Appl. No.: 16/885,062

(22) Filed: May 27, 2020

(65) Prior Publication Data

US 2021/0370941 A1    Dec. 2, 2021

(51) Int. Cl.
| | |
|---|---|
| *B60W 30/14* | (2006.01) |
| *B60W 30/18* | (2012.01) |
| *B60W 60/00* | (2020.01) |
| *G06N 3/08* | (2023.01) |
| *G06V 10/764* | (2022.01) |
| *G06V 10/774* | (2022.01) |
| *G06V 10/82* | (2022.01) |
| *G06V 20/56* | (2022.01) |

(52) U.S. Cl.
CPC .... *B60W 30/143* (2013.01); *B60W 30/18018* (2013.01); *B60W 30/181* (2013.01); *B60W 30/18109* (2013.01); *B60W 60/0011* (2020.02); *B60W 60/0015* (2020.02); *G06N 3/08* (2013.01); *G06V 10/764* (2022.01); *G06V 10/774* (2022.01); *G06V 10/82* (2022.01); *G06V 20/56* (2022.01); *B60W 2520/04* (2013.01)

(58) Field of Classification Search
CPC ....... B60W 30/18018; B60W 60/0011; B60W 60/0015; G06N 3/08
See application file for complete search history.

(56) References Cited

U.S. PATENT DOCUMENTS

| | | | |
|---|---|---|---|
| 2019/0258251 A1* | 8/2019 | Ditty | G06V 20/58 |
| 2020/0010095 A1* | 1/2020 | Kim | B60W 30/02 |
| 2020/0041994 A1* | 2/2020 | Alalao | H04W 4/40 |
| 2020/0301374 A1* | 9/2020 | Nakamura | G05B 13/048 |
| 2020/0327804 A1* | 10/2020 | Xu | G08G 1/095 |
| 2020/0406894 A1* | 12/2020 | Akella | B60W 10/18 |
| 2021/0197720 A1* | 7/2021 | Houston | G06N 3/045 |
| 2021/0197813 A1* | 7/2021 | Houston | B60W 30/143 |

* cited by examiner

*Primary Examiner* — Jelani A Smith
*Assistant Examiner* — Toya Pettiegrew
(74) *Attorney, Agent, or Firm* — WOMBLE BOND DICKINSON (US) LLP

(57) ABSTRACT

A driving environment is perceived based on sensor data obtained from a plurality of sensors mounted on an ADV. A first set of features is extracted from the sensor data representing the driving environment, where the first set of features include one or more obstacles moving relative to the ADV. A precaution notification is generated by applying a precautionary slowdown predictive model to the first set of features and a second set of features determined based on internal states of the ADV. In response to the precaution notification, a speed planning is performed to lower a speed limit of the ADV to a predetermined percentage of the speed limit. The ADV is controlled to drive autonomously according to the lowered speed limit to perform a precautionary slowdown.

23 Claims, 9 Drawing Sheets

PRECAUTIONARY SLOWDOWN SPEED PLANNING

TECHNICAL FIELD

Embodiments of the present disclosure relate generally to operating autonomous driving vehicles. More particularly, embodiments of the disclosure relate to speed planning for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional speed planning operations may follow a speed limit without considering the different driving environment. However, in complicated driving environment, the speed limit may need to be lowered, thus, the conventional speed planning operations may not be able to provide sufficient safety precautions.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
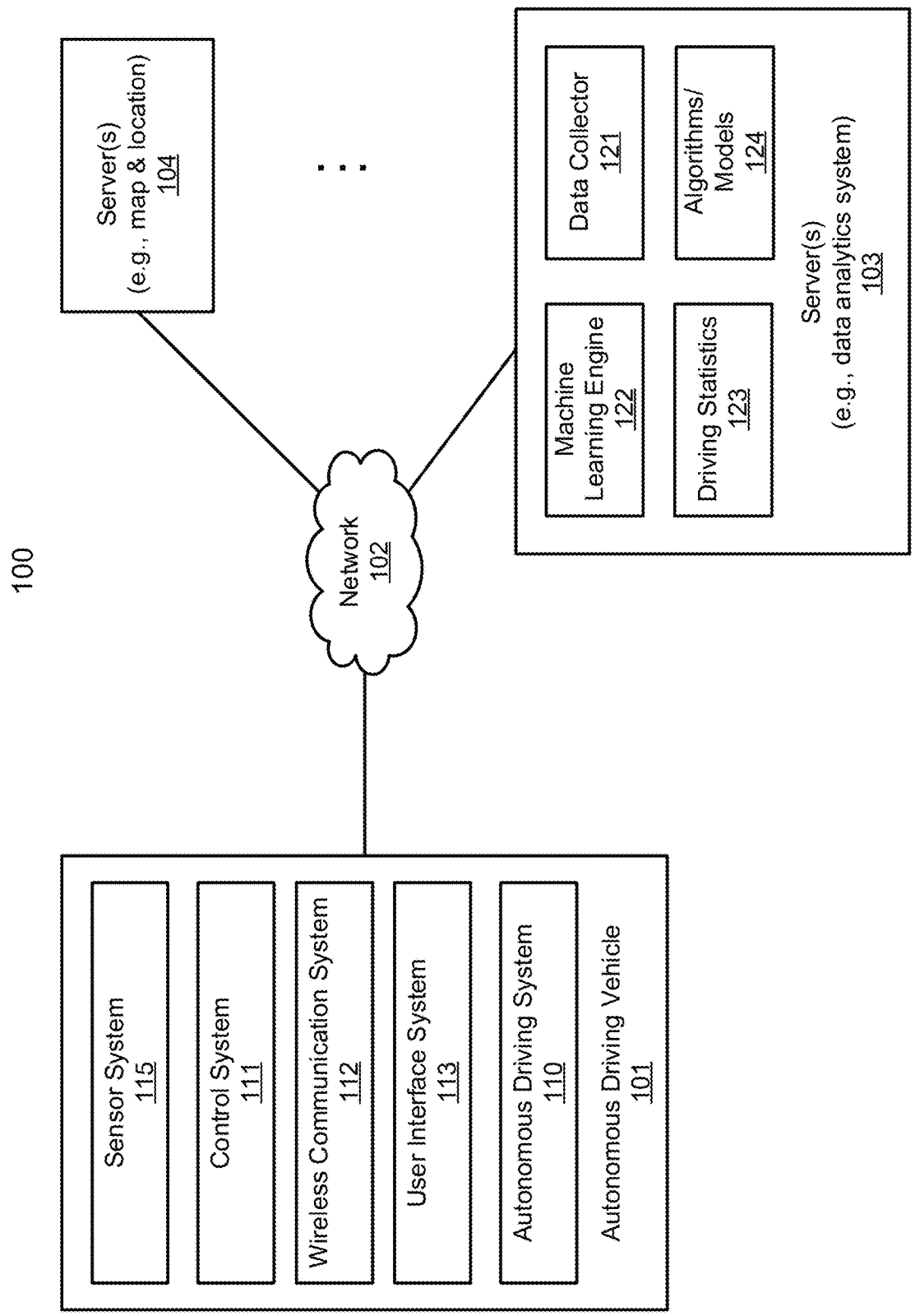
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method is provided for an ADV to perform a precautionary slowdown in a complicated driving environment. A precaution notification module may be a separate module running in parallel with a planning module of the ADV. The precaution notification module may use a precautionary slowdown predictive model to predict whether a precautionary slowdown should be performed. A first set of features representing the driving environment (e.g., obstacle relative speeds, etc.) and a second set of features based on internal states (e.g., CPU usage, planning/control modules runtime, etc.) may be input into the precautionary slowdown predictive model. The precautionary slowdown predictive model may generate an output value to indicate whether a precautionary slowdown should be performed. The precaution notification module may generate a precaution notification based on the output value of the precautionary slowdown predictive model. The precaution notification module may broadcast the precaution notification in an autonomous driving system (ADS) of the ADV. A planning module may receive the precaution notification and set a current speed limit to a predetermined percentage of an original speed limit to perform a precautionary slowdown. The precautionary slowdown predictive model may be previously trained using deep neural network (DNN) based on the first set of features and the second set of features from prior driving data with manual driving.

According to some embodiments, a driving environment is perceived based on sensor data obtained from a plurality of sensors mounted on an ADV. A first set of features is extracted from the sensor data representing the driving environment, where the first set of features include one or more obstacles moving relative to the ADV. A precaution notification is generated by applying a precautionary slowdown predictive model to the first set of features and a second set of features determined based on internal states of the ADV. In response to the precaution notification, a speed planning is performed to lower a speed limit of the ADV to a predetermined percentage of the speed limit. The ADV is controlled to drive autonomously according to the lowered speed limit to perform a precautionary slowdown.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
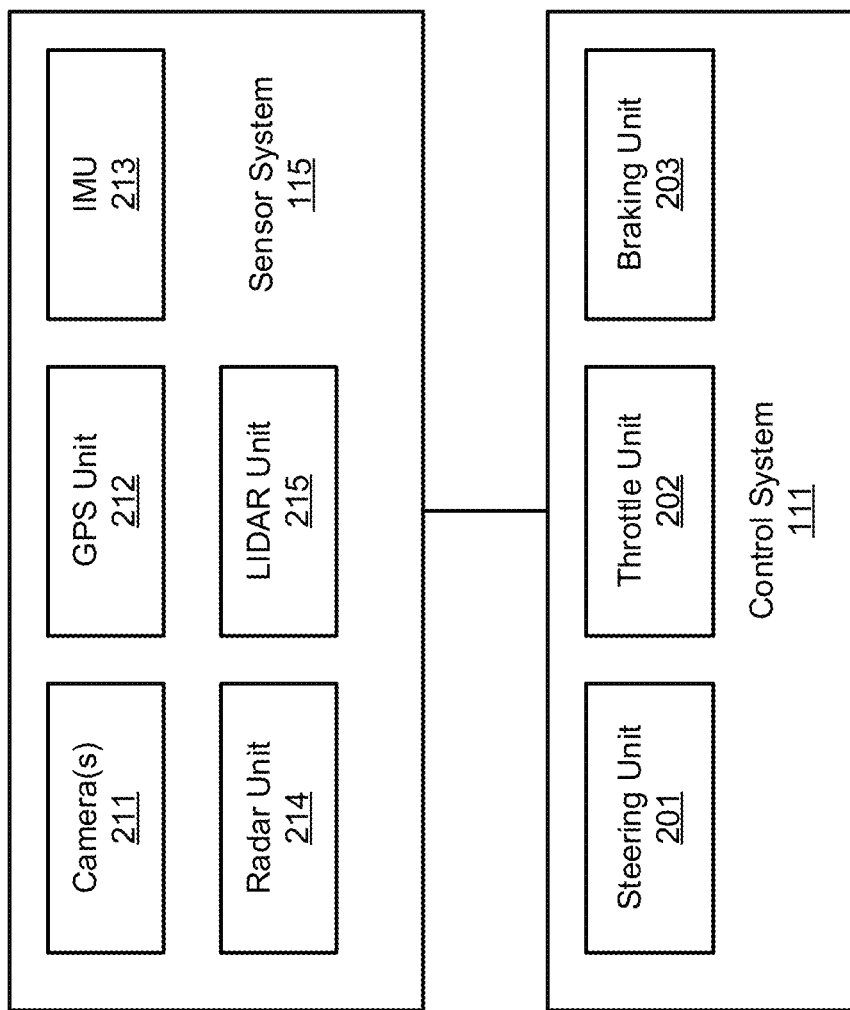
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to perceive a driving environment based on sensor data obtained from a plurality of sensors mounted on the ADV, an algorithm or model to extract a first set of features from the sensor data representing the driving environment, where the first set of features includes one or more obstacles moving relative to the ADV, an algorithm or model to generate a precaution notification by applying a precautionary slowdown predictive model to the first set of features and a second set of features determined based on internal states of the ADV, an algorithm or model, in response to the precaution notification, to perform speed planning to lower a speed limit of the ADV to a predetermined percentage of the speed limit, and/or an algorithm or model to control the ADV to drive autonomously according to the lowered speed limit to perform a precautionary slowdown, which will be described in details further below. Algorithms 124 can then be uploaded on ADVs to be utilized during autonomous driving in real-time.

Figure 3A:
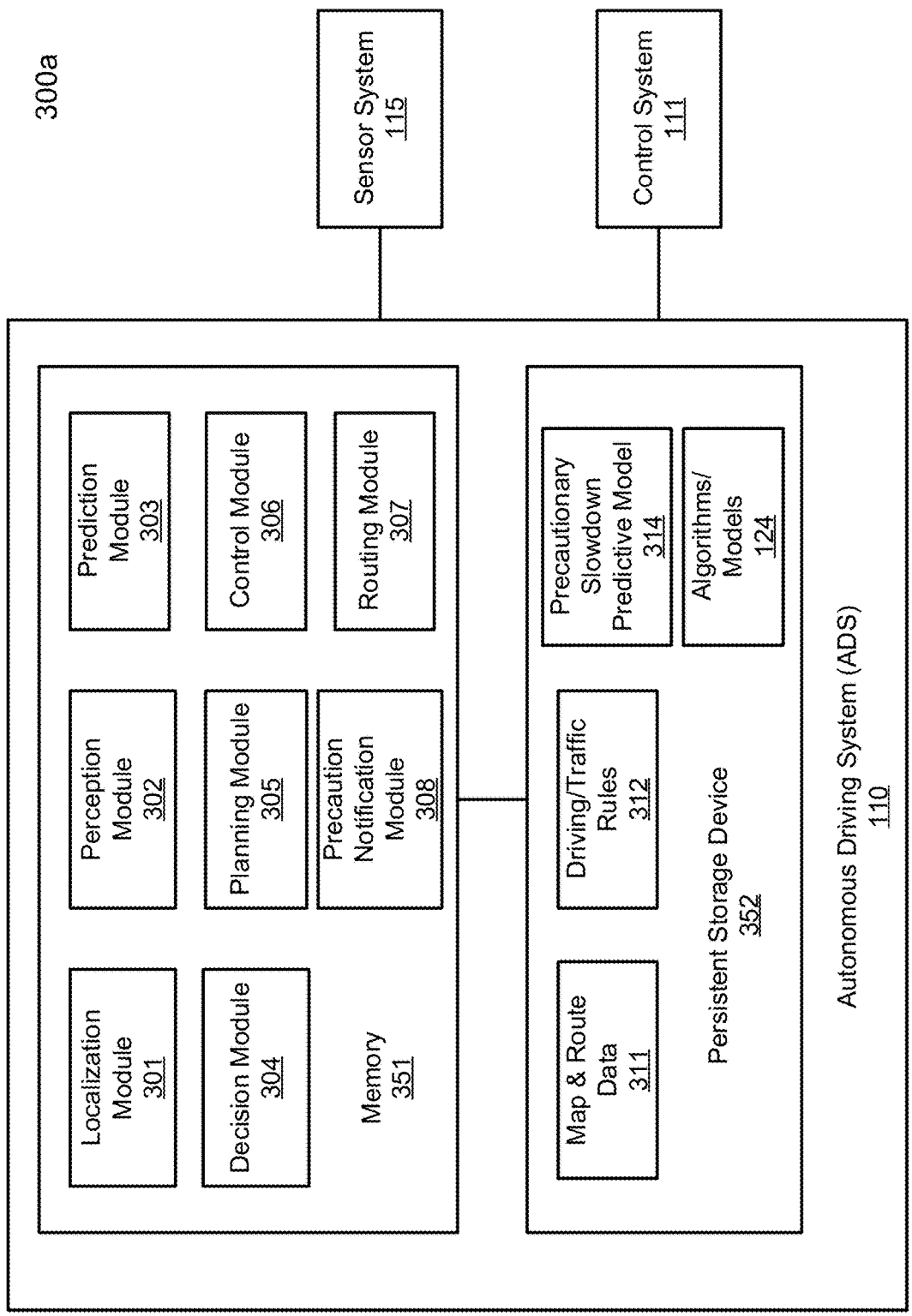
FIGS. 3A-3B are block diagrams illustrating an example of an autonomous driving system used with an autonomous driving vehicle according to one embodiment.
Figure 3B:
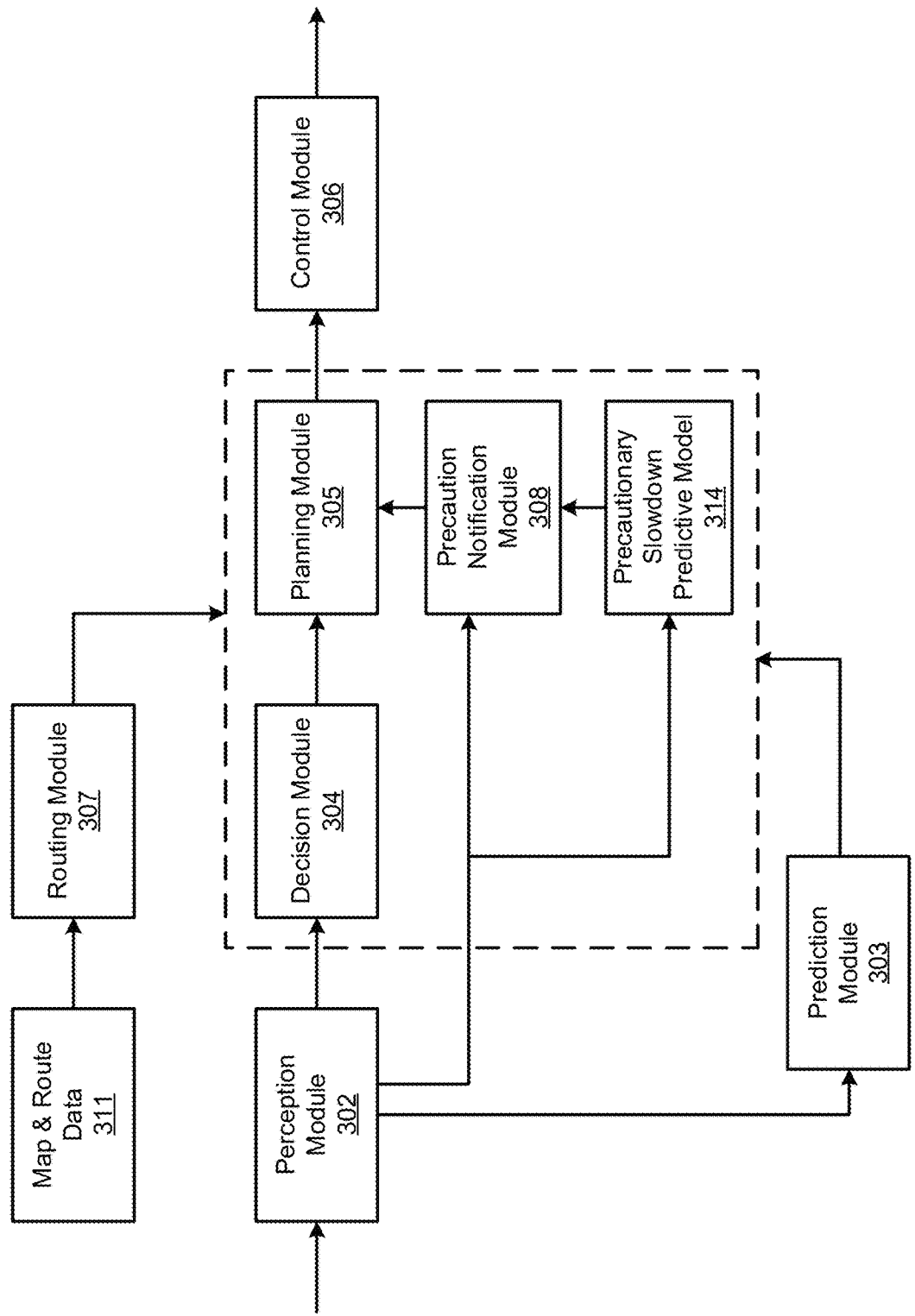

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and precaution notification module 308. In one embodiment, ADS 110 may include a precautionary slowdown predictive model 314.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
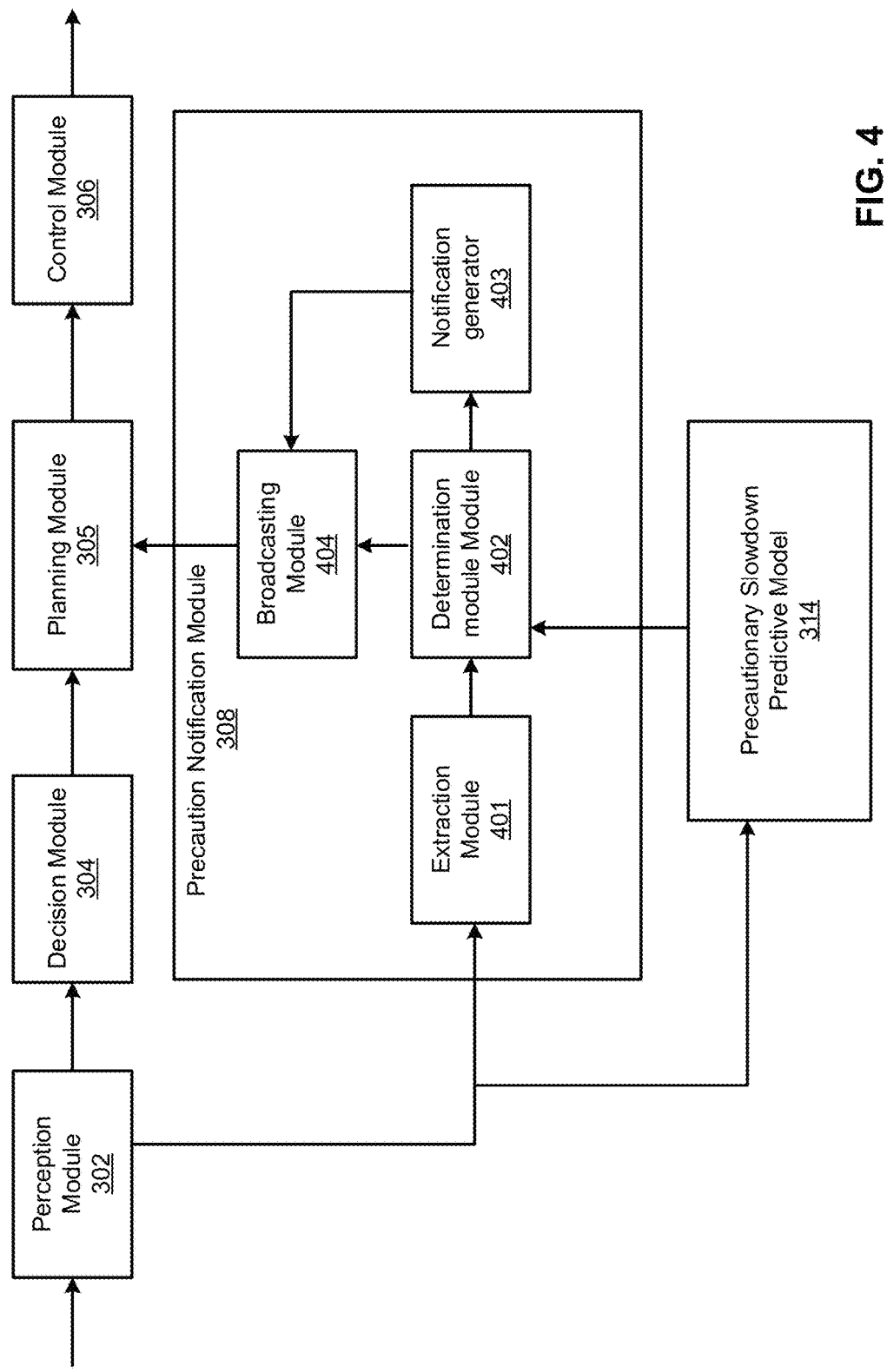
FIG. 4 is a block diagram illustrating an example of a precaution notification module according to one embodiment.

FIG. 4 is a block diagram 400 illustrating an example of a precaution notification module 308 according to one embodiment. During human driving, a precautionary slowdown may be performed in a complicated driving environment, for example, heavy traffic condition, crowded neighborhood, a large curvature of a road, a short distance to a stop sign, etc. It may be advantageous to perform a precautionary slowdown in a complicated driving environment for safety concerns. Therefore, there may be a need to develop a method/system for an ADV with an autonomous driving system (ADS) to automatically perform a precautionary slowdown in a complicated driving environment.

An ADV may be configured to have a precaution notification module 308 to determine or predict whether a precautionary slowdown should be performed. The precaution notification module 308 may be configured to work with planning module 305 to perform the precautionary slowdown. However, due to performance concerns (if we put it in the pipeline of planning, it will increase our end to end time), the precaution notification module 308 may be configured as an extra module that runs in parallel with the planning module 305. Otherwise, if the precaution notification module 308 is put into the pipeline of planning, an end to end planning time may be increased.

Referring to FIG. 4, precaution notification module includes, but is not limited to, extraction module 401, determination module 402, notification generator 403, and broadcasting module 404, which work together using precautionary slowdown predictive algorithms or models 314 to determine or predict whether a precautionary slowdown should be performed. Note that modules 401-404 may be integrated into fewer number of modules or a single module.

According to one embodiment, perception module 302 may perceive a driving environment based on sensor data obtained from a plurality of sensors mounted on the ADV. Extraction module 401 may be configured to extracting a first set of features from the sensor data representing the driving environment, where the first set of features may include one or more obstacles moving relative to the ADV. Determination module 402 may be configured to determine whether to generate the precaution notification based on an output value of the precautionary slowdown predictive model in a corresponding planning cycle. Notification generator 403 may be configured to generate a precaution notification by applying a precautionary slowdown predictive model to the first set of features and a second set of features determined based on internal states of the ADV.

Determination module 402 may be further configured to determine whether to broadcast the precaution notification in an autonomous driving system (ADS) of the ADV in a corresponding planning cycle. Determination module 402 may be further configured to determine to broadcast the precaution notification in the ADS in the corresponding planning cycle based on the precaution notification is stable. In response to the precaution notification received from the ADS of the ADV, planning module 305 may be configured to perform speed planning to lower a speed limit of the ADV to a predetermined percentage of the speed limit. Control module 306 may be configured to control the ADV to drive autonomously according to the lowered speed limit to perform a precautionary slowdown.

The precautionary slowdown predictive model 314 may be previously trained to predict or determine whether a precautionary slowdown should be performed using deep neural network (DNN) based on the first set of features and the second set of features from prior driving data with manual driving.

Figure 5:
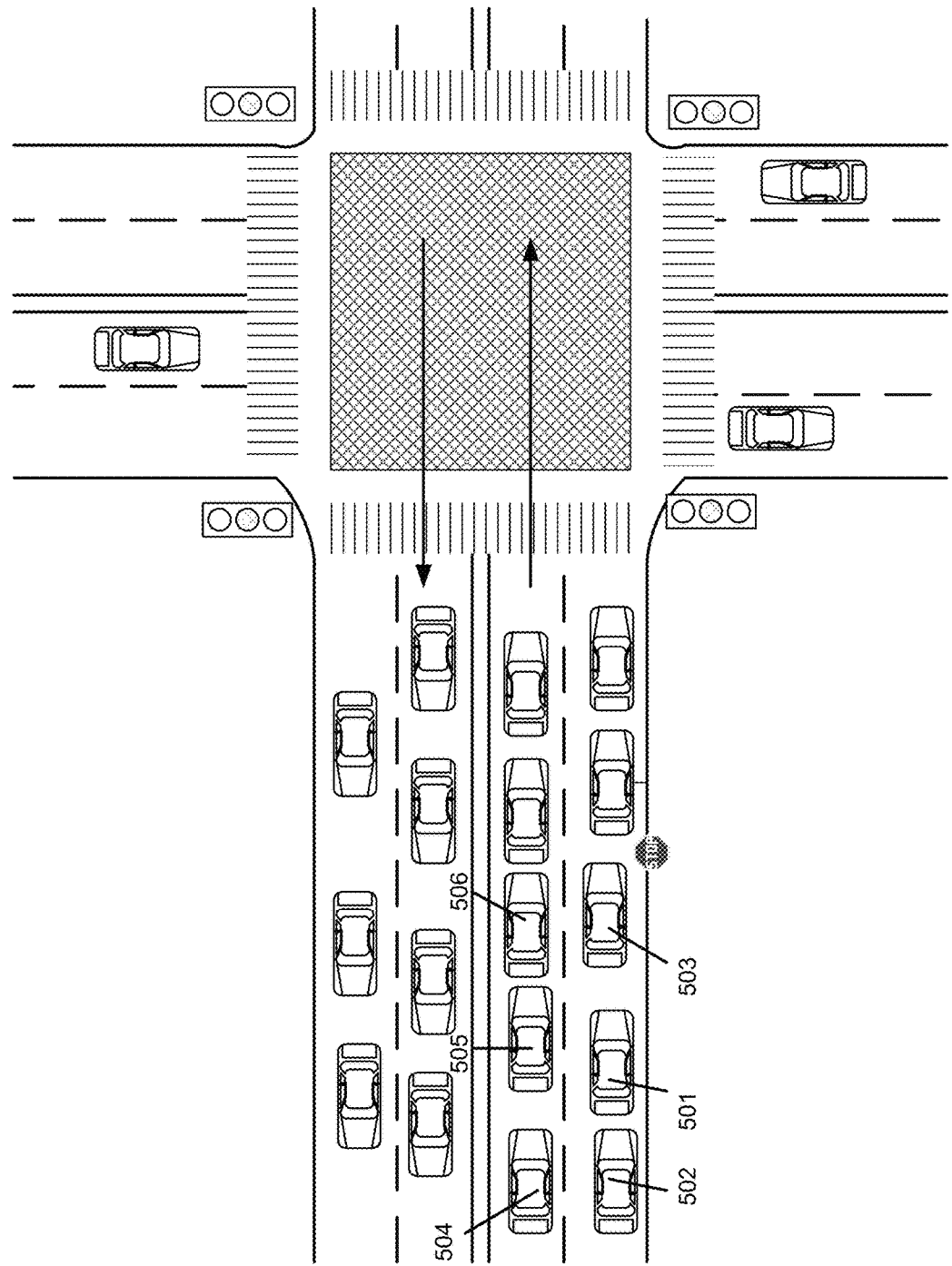
FIG. 5 illustrates an example of training a precautionary slowdown predictive model with manual driving under different driving environment.

FIG. 5 is a diagram 500 illustrates an example of training a precautionary slowdown predictive model with manual driving under different driving environment. The precautionary slowdown predictive model may be off-line trained using a deep neural network (DNN) to predict or determine whether a precautionary slowdown should be performed based on a first set of features and a second set of features from prior driving data with manual driving.

The first set of features and the second set of features may be input values to the precautionary slowdown predictive model. The precautionary slowdown predictive model may generate an output value "true" or "false" to indicate whether a precautionary slowdown should be performed. The precautionary slowdown predictive model may be off-line trained using the DNN. A DNN is an artificial neural network (ANN) with multiple layers between the input and output layers. The DNN finds the correct mathematical manipulation to turn the input into the output, whether it be a linear relationship or a non-linear relationship. The network moves through the layers calculating the probability of each output.

In off-line training, prior driving data with manual driving under different environment may be collected for training the precautionary slowdown predictive model. For example, during the manual driving, an autonomous driving system (ADS) of an ADV 501 may be turned on, but not be engaged. A route may be assigned in the ADS of the ADV, and a human driver may follow the given route to drive the ADV.

The first set of features may be extracted from sensor data representing the driving environment. The first set of features may include a number or a quantity of obstacles in a set of relative distance ranges to the ADV respectively. For example, the set of relative distance ranges may include relative distance ranges of 60 meter, 30 meter, or 10 meter. The obstacles may include vehicles, pedestrians, motorcycles, bicycles, animals, or static obstacles. For example, the first set of features may include a number or a quantity of vehicles in relative distance ranges of 60 meter, 30 meter, or 10 meter, and/or a number or a quantity of pedestrians in relative distance ranges of 60 meter, 30 meter, or 10 meter.

The first set of features may include a distance to the ADV, a relative speed to the ADV and an absolute speed of each obstacle of a predetermined number of closest obstacles. For example, the first set of features may include a distance to the ADV 501 for each of the five closest obstacles (e.g., 502, 503, 504, 505, 506), a relative speed to the ADV and an absolute speed for each of the five closest obstacles (e.g., 502, 503, 504, 505, 506).

The first set of features may include a current speed of the ADV, an acceleration of the ADV, a curvature of a road on which the ADV is driving, and/or a percentage of the current speed versus a speed limit. For example, the first set of features may the ADV's speed, acceleration, a current road curvature, and/or a percentage of current speed/speed limit.

The first set of features may further include traffic light information on the current route, and a distance to a stop line. The second set of features may be determined based on internal states of the ADV. The second set of features may include a central processing unit (CPU) usage, or a planning/perception/prediction runtime in a most recent cycle. The CPU usage may be a comprehensive measurement that reflects how complicated a current driving environment is. The second set of features may be important features to predict or determine whether a precautionary slowdown should be performed.

If the ADV 501, the current vehicle, has a speed lower than a predetermined percentage of the speed limit of the road, there might be a precautionary slowdown. However, only a lower speed may not be a sufficient indication for a precautionary slowdown. For example, the ADV may just be starting to drive. If the ADV 501 has the speed lower than the predetermined percentage of the speed limit, and the ADV 501 is not accelerating with at least a predetermined acceleration threshold, a precautionary slowdown may be performed by the human driver in the complicated driving environment. Thus, a label "true" may be assigned to an output value of the precautionary slowdown predictive model. The label "true" or the output value "true" may indicate a precautionary slowdown should be performed. Otherwise, a label "false" may be assigned to an output value of the model. The label "false" or the output value "false" may indicate a precautionary slowdown should not be performed. The predetermined percentage may be 40%, 50%, 60%, 70%, 80%, or any values therebetween. For example, the predetermined percentage may be 60%. The predetermined acceleration threshold may be 0.2, 0.3, 0.4 m/s^2. For example, the predetermined acceleration threshold may be 0.3 m/s^2.

Prior driving data with manual driving may be collected from a large amount of samples of ADVs. However, sometimes, some samples of ADVs may not be stable. For example, the output values or the labels in some samples may change in a predetermined time duration, e.g., 5 minutes, which may indicate the samples may not be stable. Data from the samples that are not stable may be removed. Thus, only data from stable samples may be kept.

The precautionary slowdown predictive model may be off-line trained using the DNN with the above first set of features and second set of features and output values (labelling). After being trained, the precautionary slowdown predictive model may be used online to generate an output value, based on the first set of features and the second set of features, to predict or determine whether a precautionary slowdown should be performed.

Figure 6:
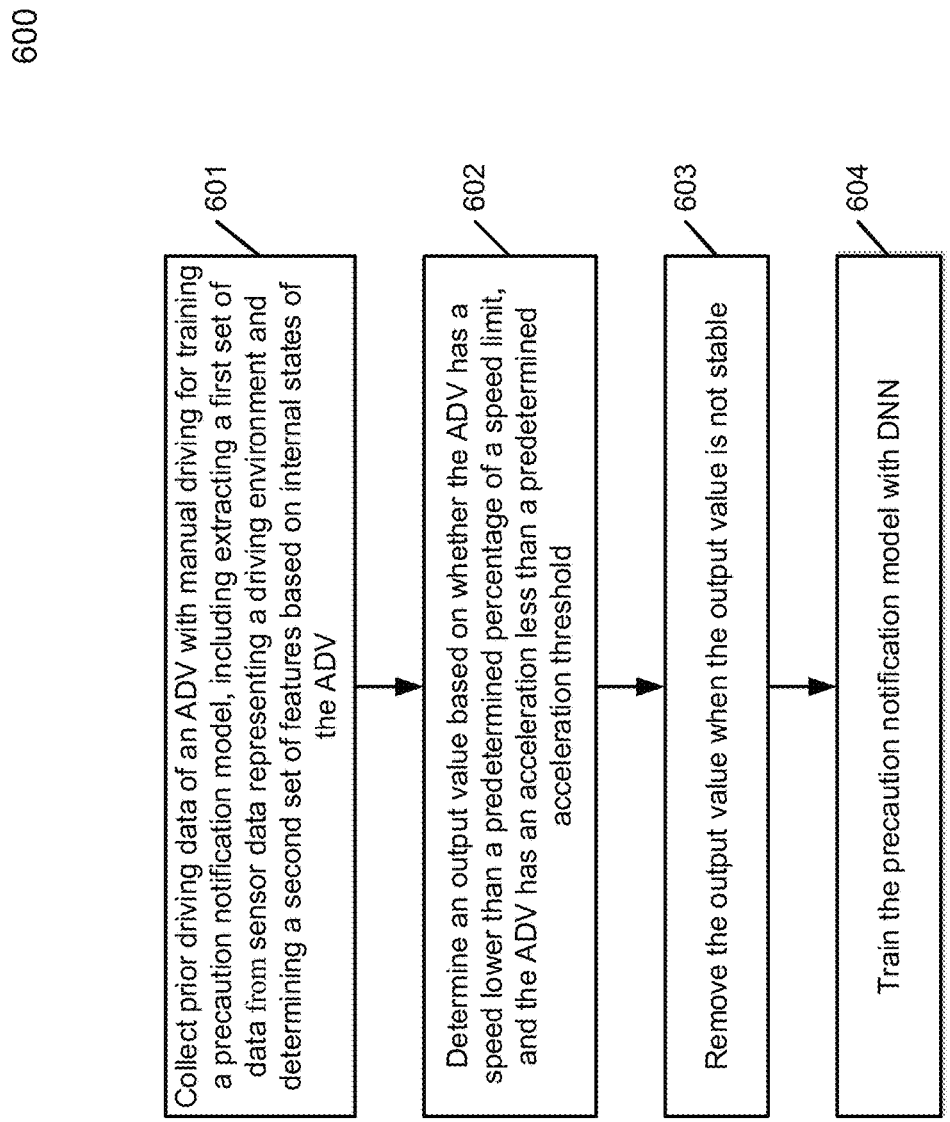
FIG. 6 is a flow chart illustrating an example of a method to training a precautionary slowdown predictive model with manual driving under different driving environment.

FIG. 6 is a flow chart illustrating an example of a method to training a precautionary slowdown predictive model with manual driving. By this method, a precautionary slowdown predictive model may be off-line trained with DNN to predict or determine whether a precautionary slowdown should be performed based on a first set of features and a second set of features from prior driving data with manual driving.

At block 601, prior driving data with manual driving under different environment may be collected for training the precautionary slowdown predictive model. For example, during the manual driving, an autonomous driving system (ADS) of an ADV (e.g., 501) may be turned on, but not be engaged. A route may be assigned in the ADS of the ADV, and a human driver may follow the given route to drive the ADV.

The first set of features may be extracted from sensor data representing the driving environment. The first set of features may include a number or a quantity of obstacles in a set of relative distance ranges to the ADV respectively. For example, the set of relative distance ranges may include relative distance ranges of 60 meter, 30 meter, or 10 meter.

The obstacles may include vehicles, pedestrians, motorcycles, bicycles, animals, or static obstacles. For example, the first set of features may include a number or a quantity of vehicles in relative distance ranges of 60 meter, 30 meter, or 10 meter, and/or a number or a quantity of pedestrians in relative distance ranges of 60 meter, 30 meter, or 10 meter.

The first set of features may further include a distance to the ADV, a relative speed to the ADV and an absolute speed of each obstacle of a predetermined number of closest obstacles. For example, the first set of features may include a distance to the ADV (e.g., 501) for each of the five closest obstacles (e.g., 502, 503, 504, 505, 506), a relative speed to the ADV and an absolute speed for each of the five closest obstacles (e.g., 502, 503, 504, 505, 506). The first set of features may further include a current speed of the ADV, an acceleration of the ADV, a curvature of a road on which the ADV is driving, and/or a percentage of the current speed versus a speed limit. For example, the first set of features may the ADV's speed, acceleration, a current road curvature, and/or a percentage of current speed/speed limit. The first set of features may further include traffic light information on the current route, and a distance to a stop line.

The second set of features may be determined based on internal states of the ADV. The second set of features may include a central processing unit (CPU) usage, or a planning/perception/prediction runtime in a most recent cycle. The CPU usage may be a comprehensive measurement that reflects how complicated a current driving environment is. The second set of features may be important features to predict or determine whether a precautionary slowdown should be performed.

The first set of features and the second set of features may be input values to the precautionary slowdown predictive model. The precautionary slowdown predictive model may generate an output value "true" or "false" to indicate whether a precautionary slowdown should be performed.

At block 602, an output value of the precautionary slowdown predictive model may be determined based on whether the ADV has a speed lower than a predetermined percentage of the speed limit, and the ADV is not accelerating with a predetermined acceleration threshold. If the ADV 501 has a speed lower than a predetermined percentage of the speed limit, and the ADV 501 is not accelerating with at least a predetermined acceleration threshold, a label "true" may be assigned to an output value of the precautionary slowdown predictive model. The label "true" or the output value "true" may indicate a precautionary slowdown should be performed. Otherwise, a label "false" may be assigned to an output value of the model. The label "false" or the output value "false" may indicate a precautionary slowdown should not be performed. The predetermined percentage may be 40%, 50%, 60%, 70%, 80%, or any values therebetween. For example, the predetermined percentage may be 60%. The predetermined acceleration threshold may be 0.2, 0.3, 0.4 m/s^2. For example, the predetermined acceleration threshold may be 0.3 m/s^2.

At block 603, data from non-stable samples may be removed. Prior driving data with manual driving may be collected from a large amount of samples of ADVs. However, some samples of ADVs may not be stable. For example, the output values or the labels in some samples may change in a predetermined time duration, e.g., 5 minutes, which may indicate the samples may not be stable. Data from the non-stable samples may be removed. Thus, only data from stable samples may be kept.

The precautionary slowdown predictive model may be trained using the DNN with the above first set of features and second set of features and output values (labelling). After being trained, the precautionary slowdown predictive model may be used online to generate an output value, based on the first set of features and the second set of features, to predict or determine whether a precautionary slowdown should be performed.

Figure 7:
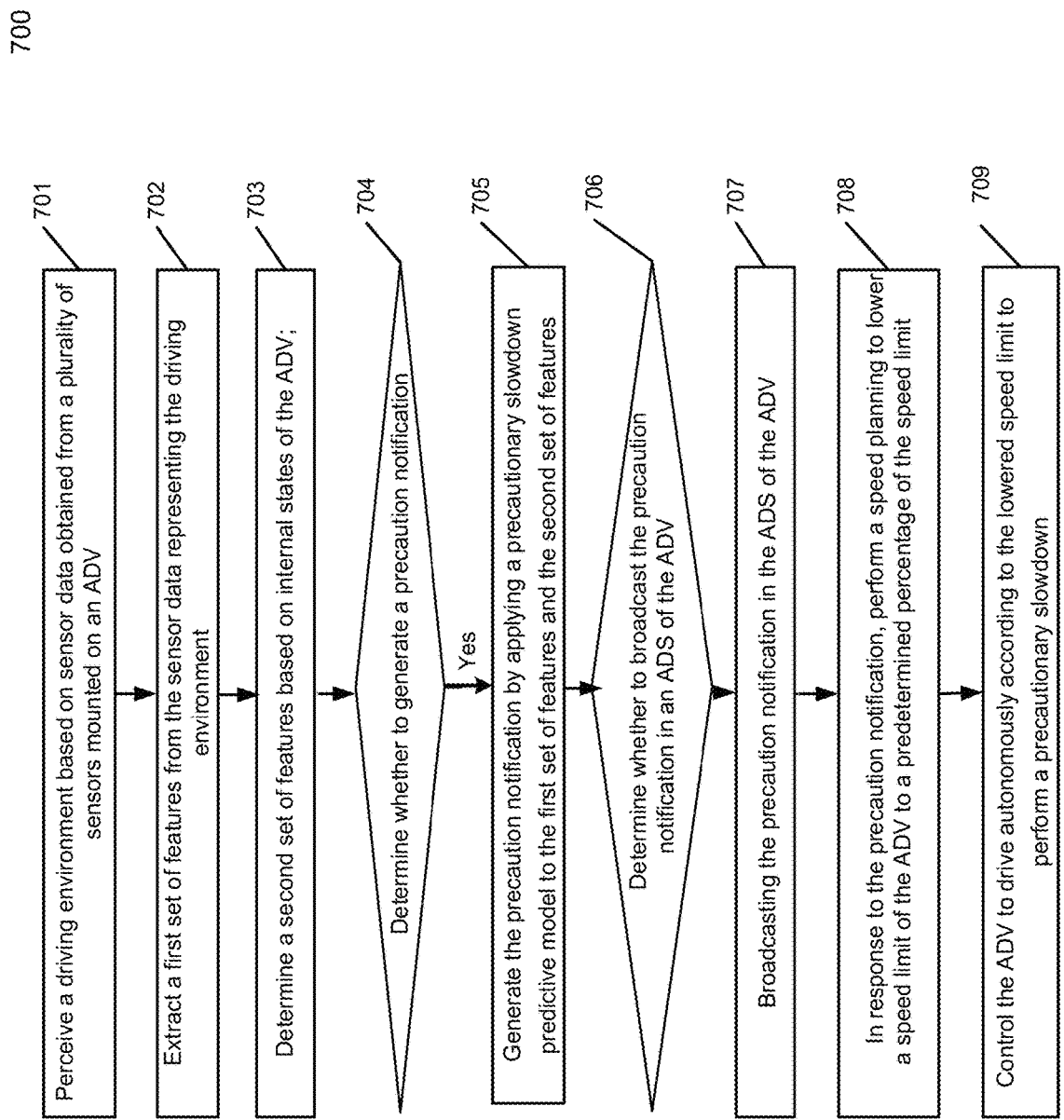
FIG. 7 is a flow chart illustrating an example of a method to perform a precautionary slowdown.

FIG. 7 is a flow chart 700 illustrating an example of a method to perform a precautionary slowdown for an ADV. The method described herein provides a human manual driving data guided, precautionary slowdown speed planning. In this method, a human manual driving date guided, precautionary slowdown may be performed automatically by the ADV in a complicated driving environment, thereby increasing a safety performance of the ADV in the complicated driving environment.

Referring to FIG. 4 and FIG. 7, the ADV may be configured to have a precaution notification module 308, which is a separate module running in its own thread and running in parallel with a planning module 305 of the ADV. Based on a current driving environment and internal states of the ADV, the precaution notification module 308 may be configured to invoke a precautionary slowdown predictive model 314 to determine or predict whether a precautionary slowdown should be performed. The precaution notification module 308 may only need to run at a lower frequency than the planning module 305, for example, to save computing power. In one embodiment, the precaution notification module 308 may only need to run at 1 Hz.

At block 701, a driving environment may be perceived, for example, by perception module 302, based on sensor data obtained from a plurality of sensors mounted on the ADV. At block 702, a first set of features may be extracted from the sensor data representing the driving environment, for example, by extraction module 401. The first set of features may include one or more obstacles moving relative to the ADV. In one embodiment, the first set of features may include a quantity of the one or more obstacles in a set of relative distance ranges to the ADV respectively, a distance to the ADV, a relative speed to the ADV and an absolute speed for each obstacle of a predetermined number of closest obstacles, a current speed of the ADV, an acceleration of the ADV, a curvature of a road on which the ADV is driving, a percentage of the current speed versus a speed limit, traffic light information, or a distance to a stop line, etc.

At block 703, a second set of features may be determined based on internal states of the ADV, for example, by determination module 402. In one embodiment, the second set of features may include a central processing unit (CPU) usage, or a planning and control runtime in a planning cycle. At block 704, whether to generate a precaution notification may be determined, for example, by determination module 402, based on an output value of the precautionary slowdown predictive model 314 in a corresponding planning cycle. The precaution notification module 308 may be configured to invoke the precautionary slowdown predictive model 314. The precautionary slowdown predictive model 314 may be previous trained with DNN to generate the output value to indicate whether a precautionary slowdown should be performed, based on the first set of features and the second set of features. In one embodiment, an output value "true" may indicate a precautionary slowdown should be performed, while an output value "false" may indicate a precautionary slowdown should not be performed.

At block 705, a precaution notification may be generated, for example, by notification generator 403. As discussed above, the precaution notification may be generated by applying the precautionary slowdown predictive model 314 to the first set of features and a second set of features determined based on internal states of the ADV. The precaution notification may be based on the output value of the precautionary slowdown predictive model 314 in a corresponding planning cycle. The precaution notification may have a value of "true" in response to an output value "true" of the precautionary slowdown predictive model 314; the precaution notification may have a value of "false" in response to an output value "false" of the precautionary slowdown predictive model 314. The precaution notification with the value of "true" may indicate the precautionary slowdown should be performed; the precaution notification with the value of "false" may indicate the precautionary slowdown should be not performed.

At block 706, whether to broadcast the precaution notification may be determined, by determination module 402, in an autonomous driving system (ADS) of the ADV in a corresponding planning cycle. Please note that the generated precaution notification may not be stable. For example, output values of the precautionary slowdown predictive model 314 may change and be inconsistent in planning cycles. In one embodiment, whether to broadcast the precaution notification in the ADS in the corresponding planning cycle is determined based on whether the precaution notification is stable.

In one embodiment, whether the precaution notification is stable is based on whether output values of the precautionary slowdown predictive model are consistent in a predetermined number of last planning cycles. The precaution notification is stable when output values of the precautionary slowdown predictive model 314 are consistent in the predetermined number of last planning cycles; the precaution notification is not stable when output values of the precautionary slowdown predictive model 314 are not consistent in the predetermined number of last planning cycles. The predetermined number may be 3, 4, 5, 8, 10, or any values therebetween. For example, the predetermined number may be 5, thus, the precaution notification is stable when output values of the precautionary slowdown predictive model 314 are consistent in the last 5 planning cycles, e.g., 5 seconds. Otherwise, the precaution notification is not stable.

When the precaution notification is stable, the generated precaution notification in the corresponding planning cycle may be broadcasted. When the precaution notification is not stable, the generated precaution notification in the corresponding planning cycle may not be broadcasted. In one embodiment, old information from a previous planning cycle may be broadcasted. For example, when output values of the precautionary slowdown predictive model 314 are not consistent in the last 5 planning cycles, a previous precaution notification broadcasted in a previous planning cycle may be broadcasted again.

At block 707, the precaution notification may be broadcasted in the ADS in the corresponding planning cycle, for example, by broadcasting module 404, based on the precaution notification is stable. At block 708, in response to the precaution notification received from the ADS of the ADV, speed planning may be performed, for example, by planning module 305, to lower a speed limit of the ADV to a predetermined percentage of the speed limit. The predetermined percentage may be 30%, 40%, 50%, 60%, 70%, 80%, 90%, or any values therebetween. For example, the predetermined percentage may be 60%. At block 709, the ADV may be controlled, for example, by control module 306, to drive autonomously according to the lowered speed limit to perform a precautionary slowdown.

Figure 8:
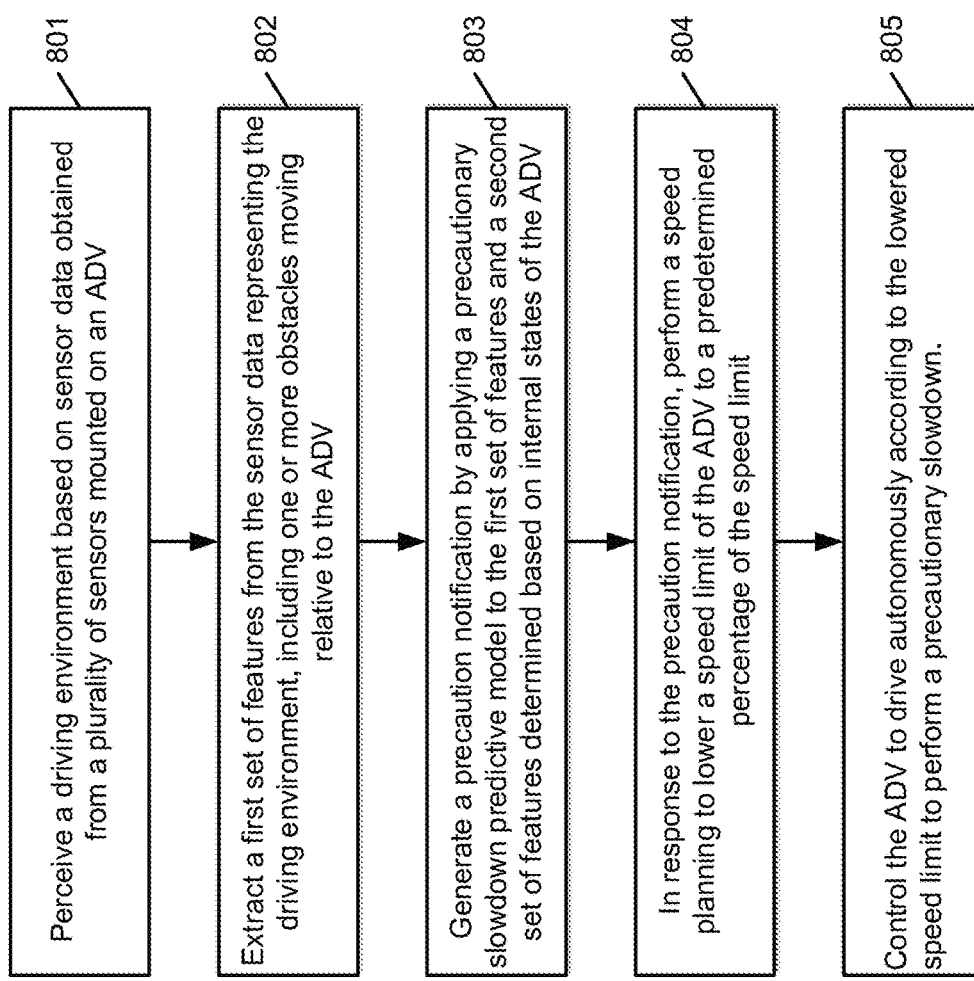
FIG. 8 is a flow diagram illustrating an example of a method to perform a precautionary slowdown.

FIG. 8 is a flow diagram illustrating a process of performing a precautionary slowdown of an ADV. Process 800 may be performed by processing logic which may include software, hardware, or a combination thereof. For example, process 800 may be performed by perception module 302, precaution notification module 308, planning module 305 and control module 306. The process 800 provides a human manual driving data guided, precautionary slowdown speed planning. In this process, a human manual driving date guided, precautionary slowdown may be performed automatically by the ADV in a complicated driving environment, thereby increasing a safety performance of the ADV in the complicated driving environment.

Referring to FIG. 8, in operation 801, processing logic perceives a driving environment surrounding an ADV based on sensor data obtained from various sensors mounted on the ADV (e.g., LIDAR, RADAR, cameras), generating perception data describing the driving environment.

In operation 802, processing logic extracts a first set of features from the sensor data representing the driving environment, including one or more obstacles moving relative to the ADV.

In operation 803, processing logic generates a precaution notification by applying a precautionary slowdown predictive model to the first set of features and a second set of features determined based on internal states of the ADV.

In one embodiment, processing logic may further determine whether to generate the precaution notification based on an output value of the precautionary slowdown predictive model in a corresponding planning cycle.

In one embodiment, processing logic may further determine whether to broadcast the precaution notification in an autonomous driving system (ADS) of the ADV in a corresponding planning cycle.

In one embodiment, whether to broadcast the precaution notification in the ADS in the corresponding planning cycle is based on whether the precaution notification is stable.

In one embodiment, whether the precaution notification is stable is based on whether output values of the precautionary slowdown predictive model are consistent in a predetermined number of last planning cycles.

In one embodiment, processing logic may further determine to broadcast the precaution notification in the ADS in the corresponding planning cycle based on the precaution notification is stable.

In one embodiment, the first set of features from the sensor data representing the driving environment includes at least one of a quantity of the one or more obstacles in a set of relative distance ranges to the ADV respectively, a distance to the ADV, a relative speed to the ADV and an absolute speed for each obstacle of a predetermined number of closest obstacles, a current speed of the ADV, an acceleration of the ADV, a curvature of a road on which the ADV is driving, a percentage of the current speed versus a speed limit, traffic light information, or a distance to a stop line.

In one embodiment, the second set of features determined based on internal states of the ADV includes a central processing unit (CPU) usage, or a planning and control runtime in a planning cycle.

In one embodiment, the precautionary slowdown predictive model was previously trained using DNN to predict whether a precautionary slowdown should be performed based on the first set of features and the second set of features from prior driving data with manual driving.

In operation 804, in response to the precaution notification, processing logic performs speed planning to lower a speed limit of the ADV to a predetermined percentage of the speed limit. In one embodiment, processing logic may further determine to perform the speed planning to lower the speed limit of the ADV to the predetermined percentage of the speed limit based on the precaution notification is stable.

In operation 805, processing logic controls the ADV to drive autonomously according to the lowered speed limit to perform a precautionary slowdown.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   perceiving a driving environment based on sensor data obtained from a plurality of sensors mounted on the ADV;
   extracting a first set of features from the sensor data representing the driving environment, the first set of features including a plurality of quantities of one or more obstacles in a plurality of relative distance ranges to the ADV, each quantity of the one or more obstacles corresponding to one relative distance range to the ADV;
   inputting the first set of features and a second set of features including a planning and control runtime in a most recent cycle to a precautionary slowdown predictive model, wherein the precautionary slowdown predictive model was off-line trained using a deep neural network (DNN) based on the first set of features and the second set of features including a central processing unit (CPU) usage and the planning and control runtime in the most recent cycle from prior driving data with manual driving, an output value of the precautionary slowdown predictive model was off-line trained based on a speed lower than a predetermined percentage threshold of a speed limit of a road and an acceleration is less than a predetermined acceleration threshold with the manual driving;
   generating a precaution notification, based on the output value of the precautionary slowdown predictive mode using the DNN, by applying the precautionary slowdown predictive model to the first set of features and the second set of features determined based on internal states of the ADV;
   broadcasting the precaution notification in an autonomous driving system (ADS) of the ADV in a corresponding planning cycle based on the precaution notification being stable based on output values of the precautionary slowdown predictive model being consistent in a predetermined number of last planning cycles;
   in response to the precaution notification being stable, performing speed planning to lower a speed limit of the ADV to a predetermined percentage of the speed limit; and
   controlling the ADV to drive autonomously according to the lowered speed limit to perform a precautionary slowdown.

2. The method of claim 1, further comprising determining whether to generate the precaution notification based on the output value of the precautionary slowdown predictive model in the corresponding planning cycle.

3. The method of claim 1, further comprising determining whether to broadcast the precaution notification in an autonomous driving system (ADS) of the ADV in the corresponding planning cycle.

4. The method of claim 3, wherein the determining whether to broadcast the precaution notification in the ADS in the corresponding planning cycle is based on whether the precaution notification is stable.

5. The method of claim 4, wherein whether the precaution notification is stable is based on whether output values of the precautionary slowdown predictive model are consistent in the predetermined number of last planning cycles.

6. The method of claim 4, further comprising determining to broadcast the precaution notification in the ADS in the corresponding planning cycle based on the precaution notification is stable, wherein the performing speed planning to lower the speed limit of the ADV to the predetermined percentage of the speed limit is further based on the precaution notification is stable.

7. The method of claim 1, wherein the first set of features from the sensor data representing the driving environment includes at least one of a quantity of the one or more obstacles in a set of relative distance ranges to the ADV respectively, a distance to the ADV, a relative speed to the ADV and an absolute speed for each obstacle of a predetermined number of closest obstacles, a current speed of the ADV, an acceleration of the ADV, a curvature of a road on which the ADV is driving, a percentage of the current speed versus a speed limit, traffic light information, or a distance to a stop line.

8. The method of claim 1, wherein the second set of features determined based on internal states of the ADV includes the central processing unit (CPU) usage, or the planning and control runtime in the planning cycle.

9. The method of claim 1, wherein the precautionary slowdown predictive model was previously trained using the deep neural network (DNN) to predict whether a precautionary slowdown should be performed based on the first set of features and the second set of features from prior driving data with manual driving.

10. A non-transitory machine-readable medium having instructions stored therein, which when executed by a processor, cause the processor to perform operations of operating an autonomous driving vehicle (ADV), the operations comprising:
perceiving a driving environment based on sensor data obtained from a plurality of sensors mounted on the ADV;
extracting a first set of features from the sensor data representing the driving environment, the first set of features including a plurality of quantities of one or more obstacles in a plurality of relative distance ranges to the ADV, each quantity of the one or more obstacles corresponding to one relative distance range to the ADV;
inputting the first set of features and a second set of features including a planning and control runtime in a most recent cycle to a precautionary slowdown predictive model, wherein the precautionary slowdown predictive model was off-line trained using a deep neural network (DNN) based on the first set of features and the second set of features including a central processing unit (CPU) usage and the planning and control runtime in the most recent cycle from prior driving data with manual driving, an output value of the precautionary slowdown predictive model was off-line trained based on a speed lower than a predetermined percentage threshold of a speed limit of a road and an acceleration is less than a predetermined acceleration threshold with the manual driving;
generating a precaution notification, based on the output value of the precautionary slowdown predictive mode using the DNN, by applying the precautionary slowdown predictive model to the first set of features and the second set of features determined based on internal states of the ADV;
broadcasting the precaution notification in an autonomous driving system (ADS) of the ADV in a corresponding planning cycle based on the precaution notification being stable based on output values of the precautionary slowdown predictive model being consistent in a predetermined number of last planning cycles;
in response to the precaution notification being stable, performing speed planning to lower a speed limit of the ADV to a predetermined percentage of the speed limit; and
controlling the ADV to drive autonomously according to the lowered speed limit to perform a precautionary slowdown.

11. The medium of claim 10, wherein the operations further comprise determining whether to generate the precaution notification based on the output value of the precautionary slowdown predictive model in the corresponding planning cycle.

12. The medium of claim 10, wherein the operations further comprise determining whether to broadcast the precaution notification in an autonomous driving system (ADS) of the ADV in the corresponding planning cycle.

13. The medium of claim 12, wherein the determining whether to broadcast the precaution notification in the ADS in the corresponding planning cycle is based on whether the precaution notification is stable, and wherein whether the precaution notification is stable is based on whether output values of the precautionary slowdown predictive model are consistent in the predetermined number of last planning cycles.

14. The medium of claim 12, wherein the operations further comprise determining to broadcast the precaution notification in the ADS in the corresponding planning cycle based on the precaution notification is stable, wherein the performing speed planning to lower the speed limit of the ADV to the predetermined percentage of the speed limit is further based on the precaution notification is stable.

15. The medium of claim 10, wherein the first set of features from the sensor data representing the driving environment includes at least one of a quantity of the one or more obstacles in a set of relative distance ranges to the ADV respectively, a distance to the ADV, a relative speed to the ADV and an absolute speed for each obstacle of a predetermined number of closest obstacles, a current speed of the ADV, an acceleration of the ADV, a curvature of a road on which the ADV is driving, a percentage of the current speed versus a speed limit, traffic light information, or a distance to a stop line, and wherein the second set of features determined based on internal states of the ADV includes the central processing unit (CPU) usage, or the planning and control runtime in the planning cycle.

16. The medium of claim 10, wherein the precautionary slowdown predictive model was previously trained using the deep neural network (DNN) to predict whether a precautionary slowdown should be performed based on the first set of features and the second set of features from prior driving data with manual driving.

17. A data processing system, comprising:
a processor; and
a memory coupled to the processor to store instructions, which when executed by the processor, cause the processor to perform operations of operating an autonomous driving vehicle (ADV), the operations including perceiving a driving environment based on sensor data obtained from a plurality of sensors mounted on the ADV;

extracting a first set of features from the sensor data representing the driving environment, the first set of features including a plurality of quantities of one or more obstacles in a plurality of relative distance ranges to the ADV, each quantity of the one or more obstacles corresponding to one relative distance range to the ADV;

inputting the first set of features and a second set of features including a planning and control runtime in a most recent cycle to a precautionary slowdown predictive model, wherein the precautionary slowdown predictive model was off-line trained using a deep neural network (DNN) based on the first set of features and the second set of features including a central processing unit (CPU) usage and the planning and control runtime in the most recent cycle from prior driving data with manual driving, an output value of the precautionary slowdown predictive model was off-line trained based on a speed lower than a predetermined percentage threshold of a speed limit of a road and an acceleration is less than a predetermined acceleration threshold with the manual driving;

generating a precaution notification, based on the output value of the precautionary slowdown predictive mode using the DNN, by applying the precautionary slowdown predictive model to the first set of features and the second set of features determined based on internal states of the ADV;

broadcasting the precaution notification in an autonomous driving system (ADS) of the ADV in a corresponding planning cycle based on the precaution notification being stable based on output values of the precautionary slowdown predictive model being consistent in a predetermined number of last planning cycles;

in response to the precaution notification being stable, performing speed planning to lower a speed limit of the ADV to a predetermined percentage of the speed limit; and controlling the ADV to drive autonomously according to the lowered speed limit to perform a precautionary slowdown.

18. The system of claim 17, wherein the operations further comprise determining whether to generate the precaution notification based on the output value of the precautionary slowdown predictive model in the corresponding planning cycle.

19. The system of claim 17, wherein the operations further comprise determining whether to broadcast the precaution notification in an autonomous driving system (ADS) of the ADV in the corresponding planning cycle.

20. The system of claim 19, wherein the determining whether to broadcast the precaution notification in the ADS in the corresponding planning cycle is based on whether the precaution notification is stable, and wherein whether the precaution notification is stable is based on whether output values of the precautionary slowdown predictive model are consistent in the predetermined number of last planning cycles.

21. The system of claim 19, wherein the operations further comprise determining to broadcast the precaution notification in the ADS in the corresponding planning cycle based on the precaution notification is stable, wherein the performing speed planning to lower the speed limit of the ADV to the predetermined percentage of the speed limit is further based on the precaution notification is stable.

22. The system of claim 17, wherein the first set of features from the sensor data representing the driving environment includes at least one of a quantity of the one or more obstacles in a set of relative distance ranges to the ADV respectively, a distance to the ADV, a relative speed to the ADV and an absolute speed for each obstacle of a predetermined number of closest obstacles, a current speed of the ADV, an acceleration of the ADV, a curvature of a road on which the ADV is driving, a percentage of the current speed versus a speed limit, traffic light information, or a distance to a stop line, and wherein the second set of features determined based on internal states of the ADV includes the central processing unit (CPU) usage, or the planning and control runtime in the planning cycle.

23. The system of claim 17, wherein the precautionary slowdown predictive model was previously trained using the deep neural network (DNN) to predict whether a precautionary slowdown should be performed based on the first set of features and the second set of features from prior driving data with manual driving.

* * * * *